United States Patent [19]
Ahlstone

[11] 4,153,281
[45] May 8, 1979

[54] MISALIGNMENT CONNECTOR WITH RETAINED INTERNAL SPHERICAL SEAL

[75] Inventor: Arthur G. Ahlstone, Ventura, Calif.

[73] Assignee: Vetco, Inc., Ventura, Calif.

[21] Appl. No.: 823,919

[22] Filed: Aug. 12, 1977

[51] Int. Cl.² ............................................. F16L 27/06
[52] U.S. Cl. ................................. 285/167; 277/9.5; 285/263; 285/380; 285/39
[58] Field of Search ................. 285/167, 334.2, 334.3, 285/379, 380, 375, 267, 268, 269, 263, 18; 277/9.5, 11, 189

[56] References Cited

U.S. PATENT DOCUMENTS

| | | | |
|---|---|---|---|
| 969,422 | 9/1910 | Tanner et al. | 285/334.2 X |
| 1,164,040 | 12/1915 | Walton | 285/269 X |
| 1,271,179 | 7/1918 | Langton et al. | 285/167 |
| 2,017,544 | 10/1935 | McHugh | 285/375 X |
| 2,208,353 | 7/1940 | Woolley et al. | 285/379 X |
| 3,321,217 | 5/1967 | Ahlstone | 285/18 |
| 3,477,748 | 11/1969 | Tinsley | 285/268 X |
| 3,492,027 | 1/1970 | Herring | 285/351 |
| 3,628,812 | 12/1971 | Larralde | 285/351 X |

*Primary Examiner*—Thomas F. Callaghan
*Attorney, Agent, or Firm*—Subkow and Kriegel

[57] ABSTRACT

A misalignment connector has a pair of hubs providing internal, opposed spherical surfaces loaded into engagement with an internal, metal sealing ring having a spherical, outer sealing surface, the hubs being constrained together to maintain loading of the seal ring over a range of angles of misalignment. The internal seal ring is initially retained in position with respect to one of the hubs and is shiftable for proper sealing and loading engagement by the hubs over the range of permissible misalignment. The metal-to-metal seal between the hubs and the seal ring is backed up by a resilient seal. The metal seal ring has an outer peripheral projection forming a connection for the retainer, and the projection is engageable by the hubs to angularly shift the seal ring during assembly.

23 Claims, 8 Drawing Figures

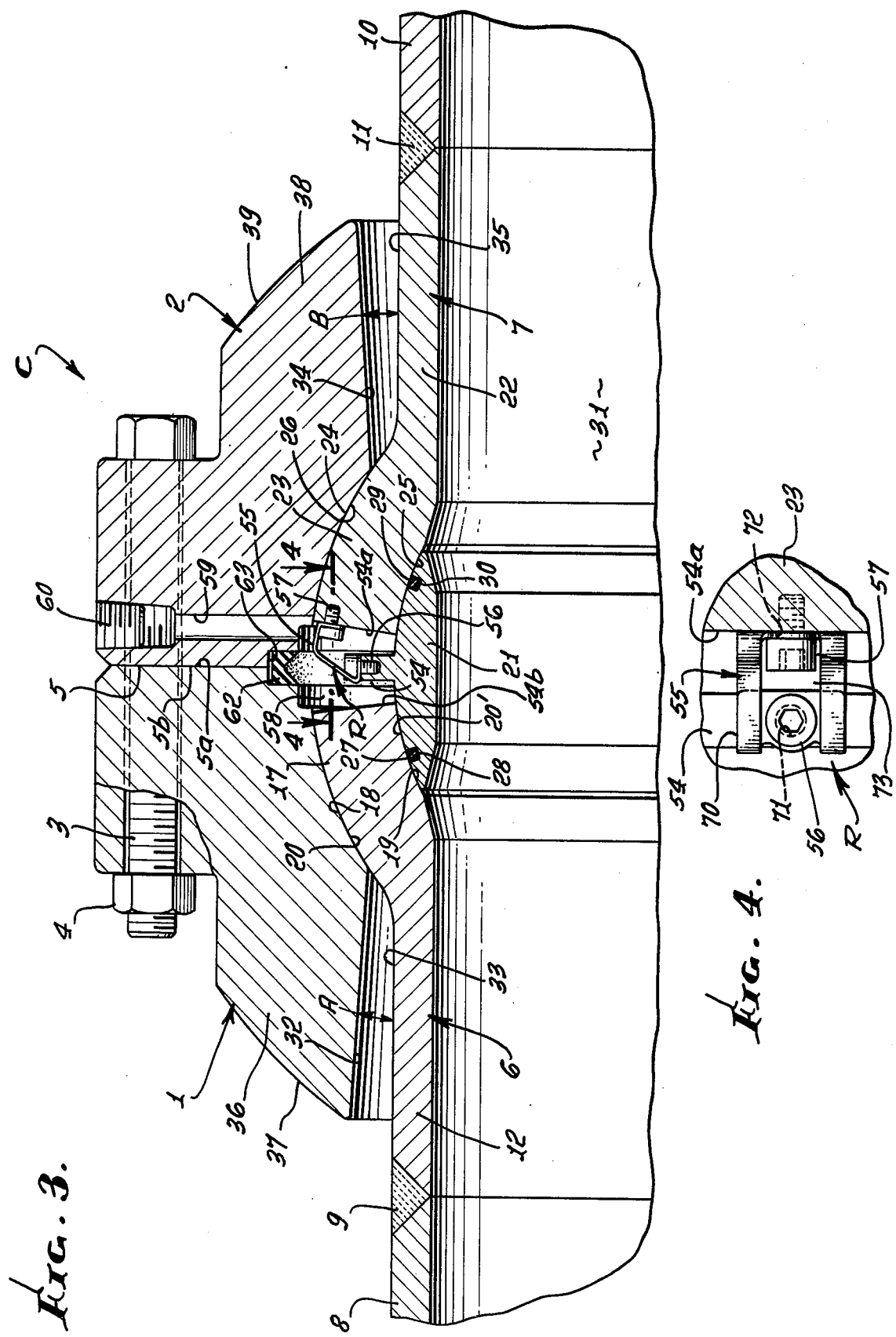

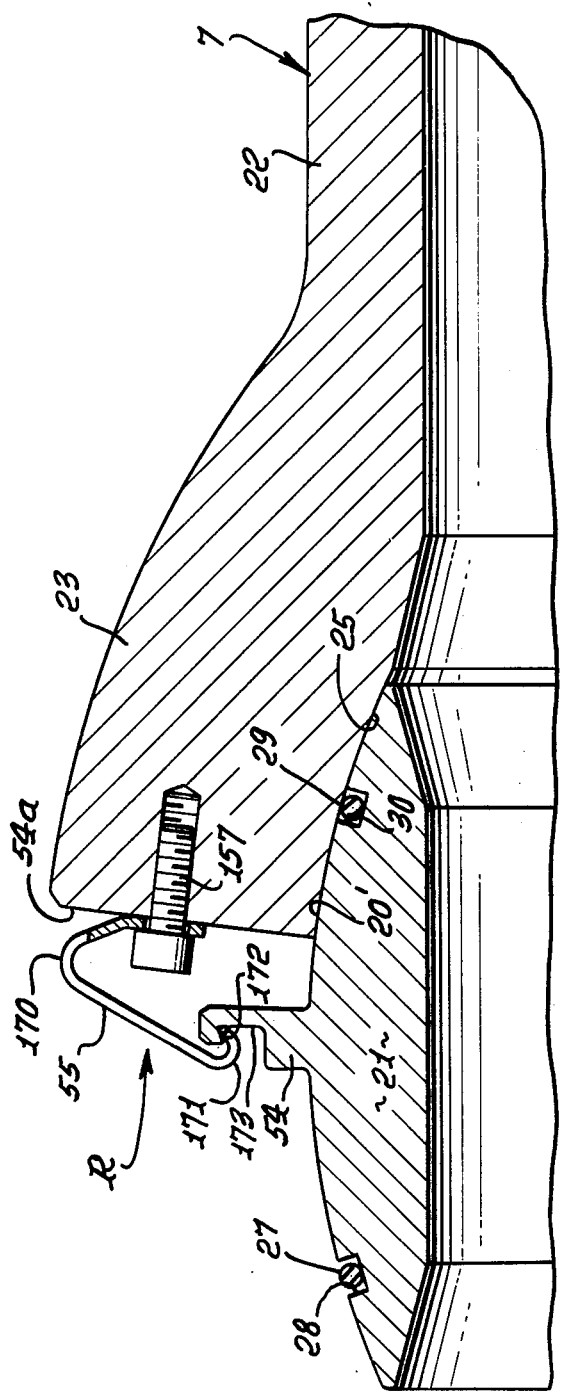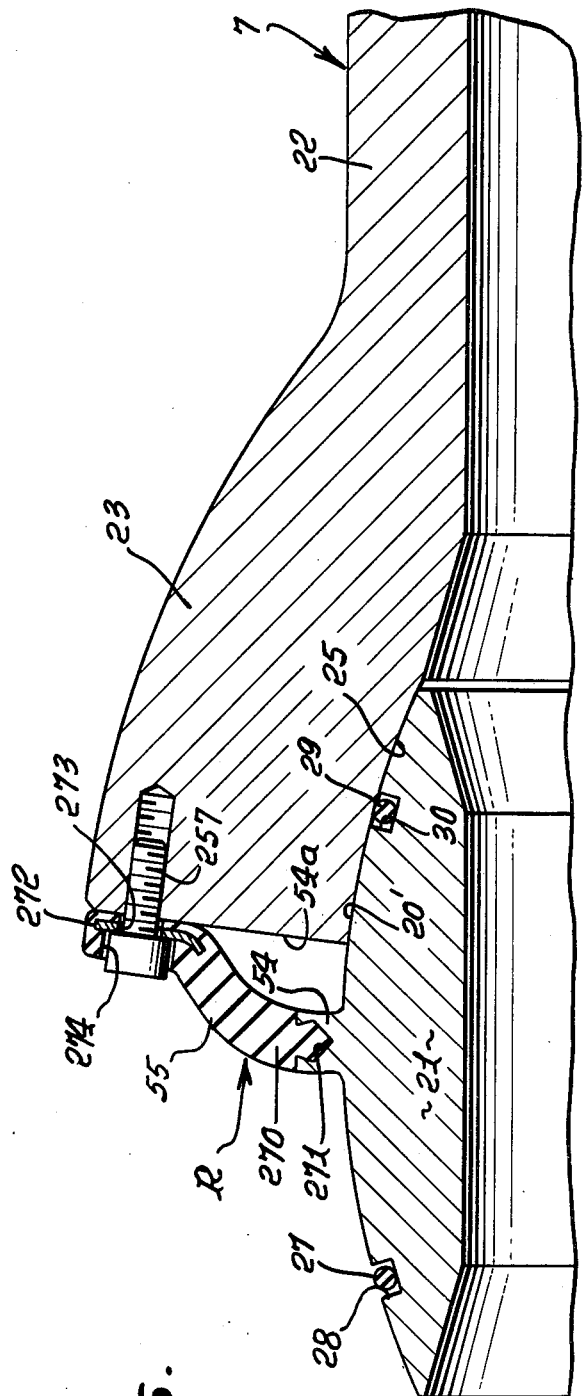

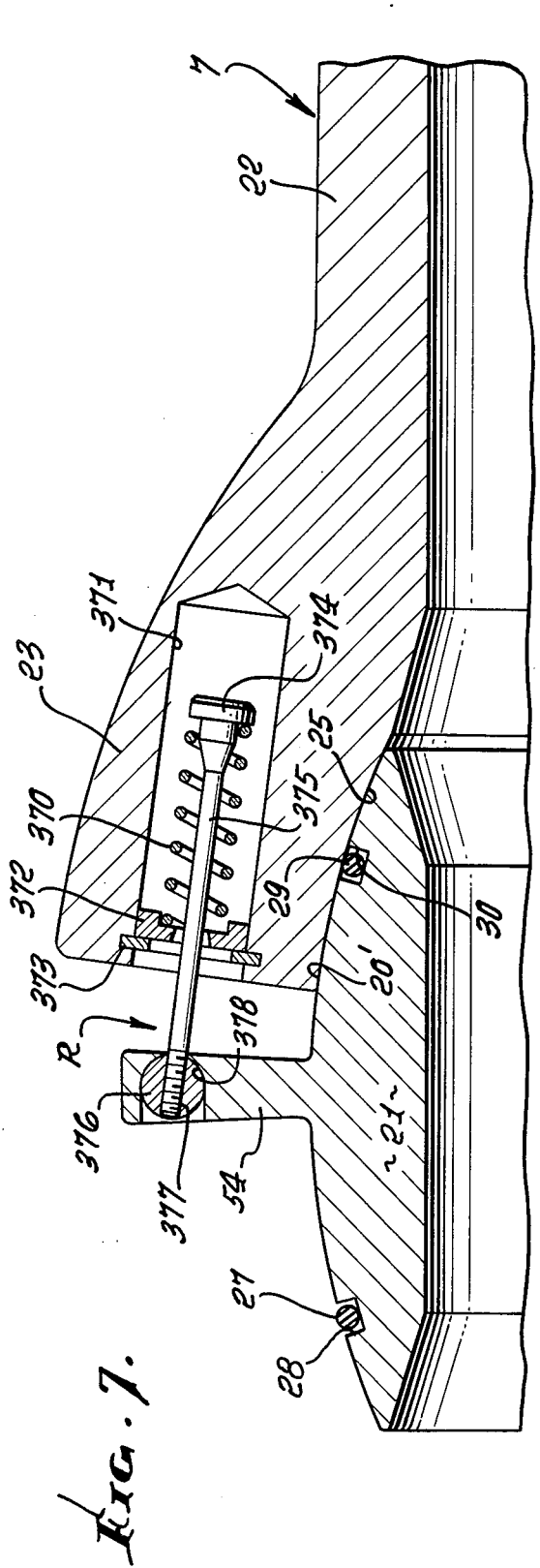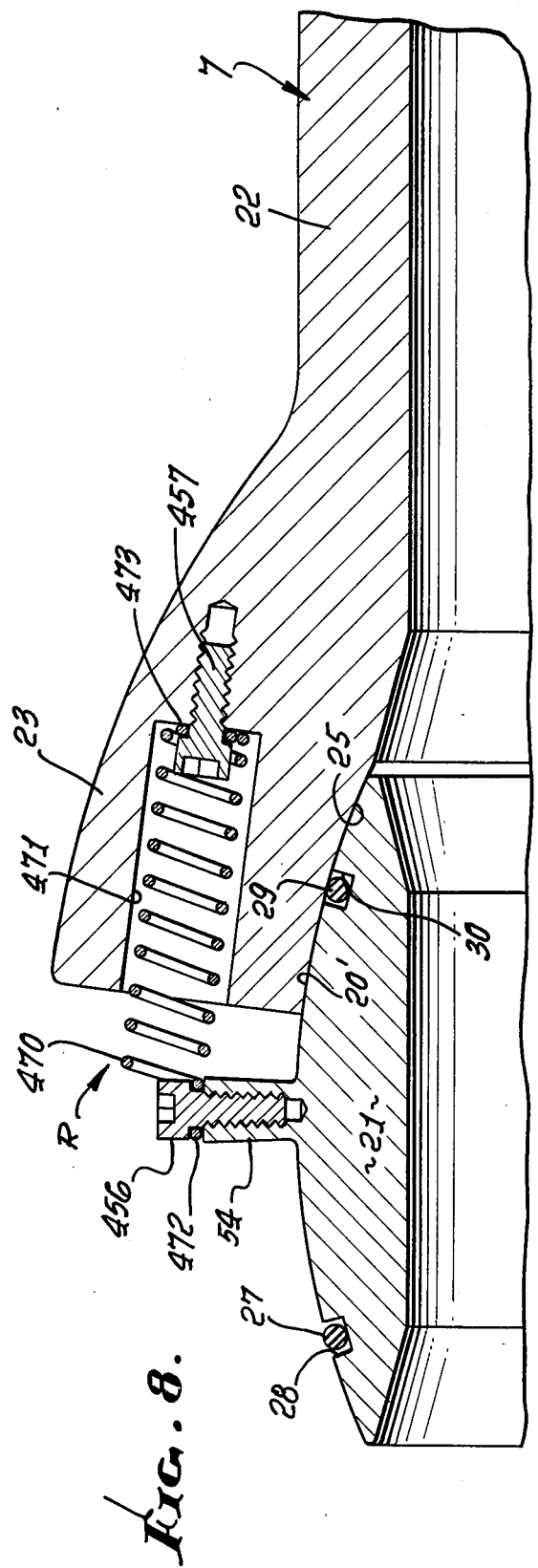

MISALIGNMENT CONNECTOR WITH RETAINED INTERNAL SPHERICAL SEAL

The offshore oil and gas industry has been, and is, more generally adopting the practice of utilizing large subsea pipe lines for gathering and transporting production from wells completed on the floor of the sea at substantial depths. A pipeline may be damaged and require repair in such a subsea environment. A typical repair may involve the very costly installation of a connector which can be made up between pipe sections which are misaligned over a range of angles rendering the makeup of flange connections very difficult. On the other hand, in some pipeline systems regular flanged connectors are used where misaligned connectors would be advantageous and would simplify the makeup of connections, even where the pipe is only slightly misaligned.

Such operations performed in a subsea environment by divers with special equipment are very difficult, at best, and as the depth of such pipelines increases, requiring the use of diving bells with manipulative tools for remote makeup, the problems are even more difficult and costly.

Ball and socket connectors for pipe are notorious, wherein a range of angular misalignment between the connector parts can be tolerated, but such connectors, for use in subsea pipelines are extremely costly to manufacture and install in the subsea environment. Moreover, when such connectors are of the typical ball and socket type, the seal diameter is quite large requiring very large constraining means to maintain the ball member sealingly engaged in the socket member. The constraining means may also be very difficult to makeup sufficiently to provide good tensile and compressive strength in the connector. Such problems are generally not present in various smaller misalignment connectors used in more conventional applications, in pipe which is not subjected to axial loading of any consequence, and wherein freedom to swivel may be desired. Elastomeric or flexible sealing means have also been employed in some ball type or misalignment connectors, but elastomeric or flexible sealing material is not reliable as a seal over a long period of time, as compared with a metal-to-metal seal, or a metal-to-metal seal with an elastomeric flexible backup seal. Where means have been provided for loading the ball and socket members together in subsea misalignment connectors using hydraulic means, the hydraulic equipment, as well as the connectors, have been very elaborate and costly. Elaborate structures have also been provided for eliminating the problem of misalignment of the pipe otherwise than in the connector itself.

In my companion application for United States Letters Patent, Ser. No. 824,071 filed Aug. 12, 1977 and now abandoned, there is disclosed a misalignment connector for pipe which can be made up in a subsea environment more easily and with less cost than the prior art subsea misalignment connectors, such as those disclosed in the following United States Patents:

U.S. Pat. No. 3,658,366—Apr. 25, 1972—Welch, Jr.
U.S. Pat. No. 3,737,179—June 5, 1973—White, Jr.
U.S. Pat. No. 3,780,421—Dec. 25, 1973—White, Jr., et al.
U.S. Pat. No. 3,997,197—Dec. 14, 1976—Marsh et al.

In addition, the misalignment connector of my above-identified application has metal-to-metal sealing contact, backed up by a resilient seal, provided by preloading a metal, internal sealing ring or gasket having external spherical sealing surfaces between opposed misalignment hubs having spherical ring engaging surfaces enabling preloading of the metal sealing ring over a range of angles of misalignment, whereby the sealing and strength characteristics of the connector are superior to other known swivel or misalignment couplings for other uses, such as disclosed in the following United States Patents:

U.S. Pat. No. 3,712,645—Jan. 23, 1973—Herter
U.S. Pat. No. 3,848,899—Nov. 19, 1974—Smith Internal ring gaskets have heretofore been retained in place in a connector, where misalignment is not permitted, until the companion connector parts can cooperatively retain the seal ring in place, for example, as disclosed in my prior U.S. Pat. No. 3,350,103, Oct. 31, 1967, and as shown by way of further example in the collet connector of Cameron Iron Works, Inc., Houston, Texas, illustrated in the COMPOSITE CATALOG OF OIL FIELD EQUIPMENT AND SERVICES, 1976–77, pg. 1420, Gulf Publishing Company, Houston, Texas. In my companion application for the United States Letters Patent, Ser. No. 804,726 filed June 8, 1977 there is disclosed a flange type connector of the American Petroleum Institute standard type for use with metal ring gaskets of the "R" and "RX" types, wherein the metal ring gasket is initially supported in a position with respect to one connector part for proper loading between the respective connector parts, wherein the connector parts are aligned.

The present invention has an objective the provision of a misalignment connector of the type enabling the connector to be made up simply and safely, even in a hostile subsea environment.

More particularly, the invention provides a misalignment connector which enables the connector to be made up to load an internal ring seal having a spherical outer periphery between opposing spherical surfaces internally of connector hubs or parts which are restrained together in such a manner that the connector can be made up over a substantial range of angular misalignment, the seal ring being initially supported by one of the hubs in or nearly in engagement with one of the internal spherical hub surfaces by retaining means which enable freedom of angular movement of the sealing ring both axially and angularly, to enable proper positioning and loading of the sealing ring between the hubs over the full permissible range of angular misalignment of the connector parts.

Such a construction and support for the internal sealing ring enables the connectors to be made up by divers or manipulators in a difficult subsea environment or by remote controls, depending upon the parts being connected, with certainty that the internal seal ring will be properly positioned between the parts.

In accomplishing the foregoing, the seal ring is supported by a flexible or resilient retainer interconnected between the end face of one of the connector hubs and the outer periphery of the sealing ring which allows axial and angular movement of the ring and circumferential loading thereof. The seal ring has a radially outward projecting flange or projection engageable by the confronting end surface of either hub to limit relative angular movement, and the retainer means is connected to this flange.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense.

Referring to the drawings:

FIG. 3 is an enlarged view showing the made up connector of FIG. 2, utilizing one form of the retaining means for the sealing ring.

FIG. 4 is a fragmentary detail view on the line 4—4 of FIG. 3;

FIG. 5 is a fragmentary section showing another form of retainer means;

FIG. 6 is a fragmentary section showing another form of retainer means;

FIG. 7 is a fragmentary section showing another form of retainer means; and

FIG. 8 is a fragmentary section showing another form of retainer means. The connector specifically shown herein and described below is one form of connector to which the metal seal ring retainer of the invention is applicable. It corresponds with that shown in my above-identified companion application for United States Letters Patent, Ser. No. 824,071 but the invention may also be incorporated in other connectors of the type wherein angular misalignment may be encountered in an environment where retention of the deformable, internal metal ring seal or gasket and makeup of the connector are difficult or hazardous. Other examples of such connectors are shown in my companion applications for United States patent, Ser. No. 834,683 filed Sept. 19, 1977, Ser. No. 823,918 filed Aug. 12, 1977.

Figure 1:
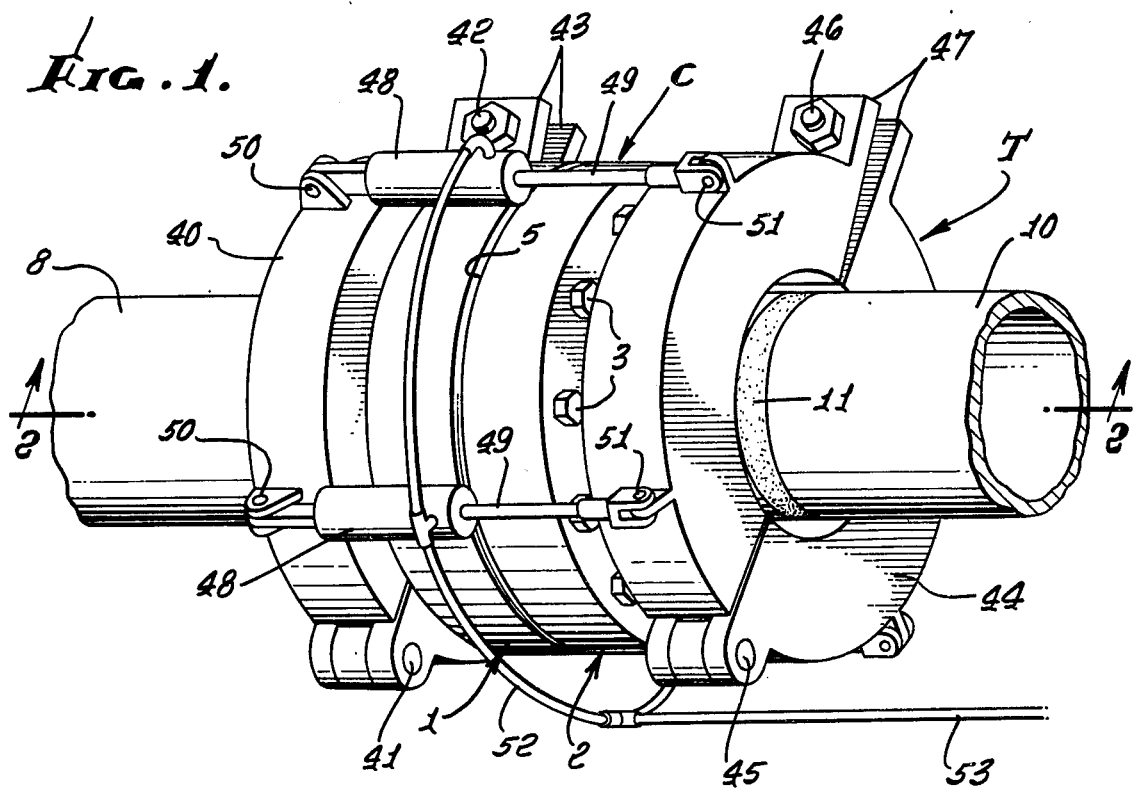
FIG. 1 is a perspective view illustrating one form of connector in a loading tool.
Figure 2:
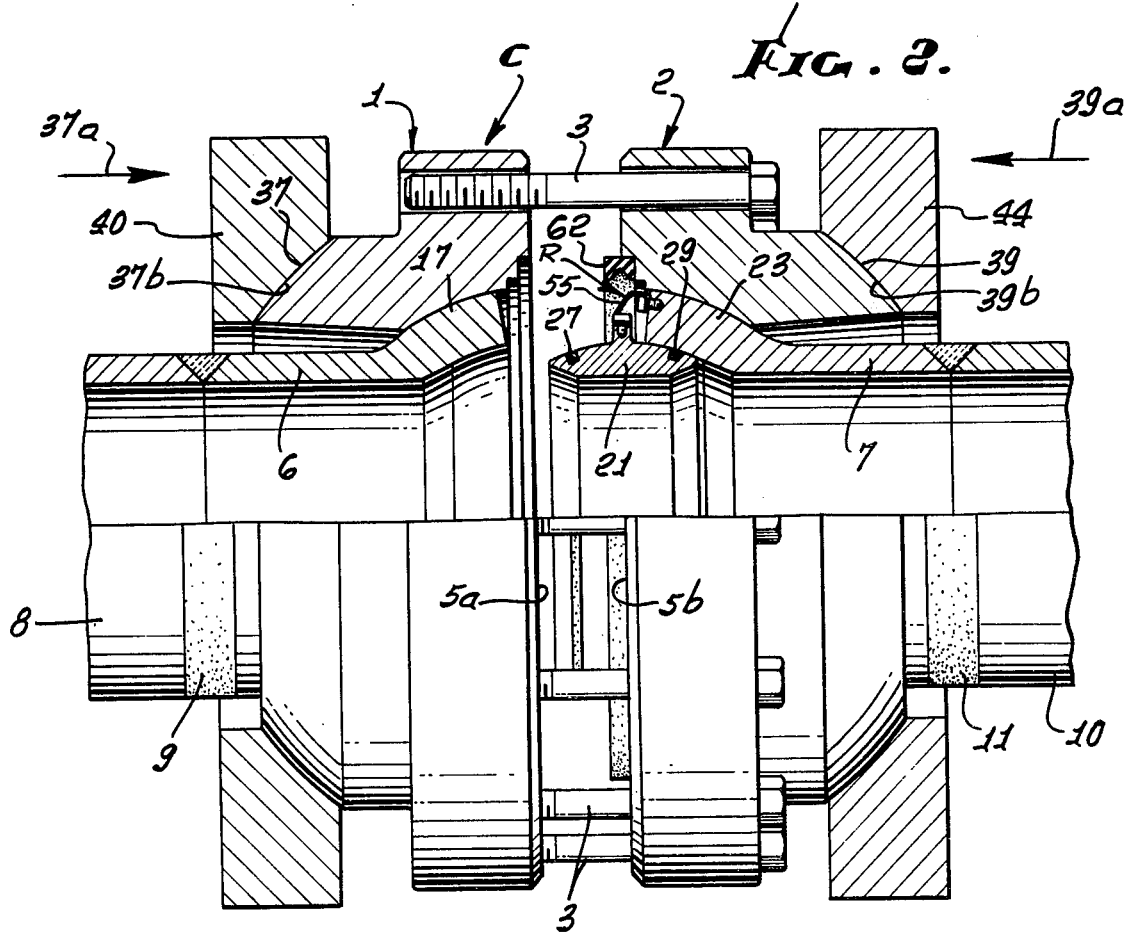
FIG. 2 is a longitudinal section, as taken, on the line 2—2 of FIG. 1, with the loading tool broken away, and the connector partially assembled.

As seen in the drawings, a pipe connector C, made in accordance with the invention, comprises a pair of complemental connector body parts 1 and 2, in the form shown in FIGS. 1 through 3, comprising a pair of connector flanges, constrained together by circumferentially spaced bolts 3 having nuts 4 threaded thereon, the bolts extending through the flanges and clamping the flanges together at a transverse meeting plane 5 which limits movement of the flanges 1 and 2 towards one another. Within the flanges are a pair of connector hubs 6 and 7, adapted to be moved axially towards one another by the flanges 1 and 2 as the connector is being made up. The connector hub 6 is joined to a length of pipe 8 by a circumferentially continuous weld 9, and the connector hub 7 is joined to another section of pipe 10 by a circumferentially continuous weld 11. The connector hub 6 includes a cylindrical body section 12 formed with an outwardly flaring hub end 17. This hub end 17 has an external spherical surface 18 and an internal spherical surface 19, the external spherical surface 18 being engageable by a companion internal spherical surface 20 provided within the connector flange 1 and the internal spherical surface 19 of the hub end 17 being engageable with the external spherical surface 20' at one side of a metal sealing ring 21.

Correspondingly, in the embodiment illustrated herein, the connector hub part 7 has a cylindrical body 22 provided with an outwardly flared hub end 23, this hub end having an external spherical surface 24 and an internal spherical surface 25, the spherical surface 24 being engageable within the internal spherical surface 26 of the connector flange 2, and the internal spherical surface 25 being engageable with the external spherical surface 20' of the metal sealing ring 21.

When the flanges 1 and 2 are bolted together to move the opposing radial surfaces 5a and 5b thereof into abutting engagement, the co-engaged spherical surfaces 18 and 20 of the flange 1 and the hub end 17 and the corresponding co-engaged spherical surfaces 24 and 26 of the hub end 23 of the flange 2 move the hubs 6 and 7 towards one another and engage the outer peripheral, spherical surface 20' of the metal seal ring 21 between the internal spherical surfaces 19 and 25 of the respective hub ends 17 and 23, so as to axially and circumferentially energize or preload the metalic sealing ring and provide tight metal-to-metal sealing contact between the opposing spherical surfaces of the sealing ring and the hub ends.

A resilient back up seal for the metal-to-metal seal between the respective hubs and the metal sealing ring is provided. An elastomeric sealing ring 27 is disposed between the hub end 17 and the metal sealing ring 21, the elastomeric sealing ring being carried in a circumferentially extended groove 28 provided about the outer periphery of the metal sealing ring 21. An additional elastomeric sealing ring 29 is disposed between the outer spherical surface 20' of the seal ring 21 and the inner spherical surface 25 of the hub end 23 and is disposed in a circumferentially extended groove 30 provided in the outer periphery of the seal ring 21. When the connection is made up, the pressure of fluid within the passage 31, which extends through the connector within the inner periphery of the seal ring 21, can act on the seal ring 21 to pressure load the metal-to-metal sealing surfaces into tight sealing engagement.

It is apparent that while the hubs 6 and 7 are shown in axial alignment with one another, the spherical shape of the inner and outer surfaces of the hub ends 17 and 23 and the spherical outer shape of the seal ring 21, together with the spherical shape of the internal flange surfaces 20 and 26 enable the connector hubs 6 and 7 to be disposed at a range of angles of misalignment. The flange 1 has an internal wall 32 extending longitudinally outwardly from the inner spherical surface 20 and flaring outwardly at an angle A, as shown with respect to the outer cylindrical surface 33 of the connector hub 6. Thus it will be appreciated that the hub 6 can be positioned relative to the flange 1 at a selected angle within the range of angle A, and the companion spherical surfaces of the flange 1 and the seal ring 21 will engage the outer spherical surface 18 and the inner spherical surface 19 of the hub end 17, with the spherical surfaces all loaded against one another and with the seal ring 21 axially loaded towards the connector hub 7. Correspondingly, the connector flange 2 has an internal wall 34 flaring outwardly at an angle B with respect to the outer cylindrical surface 35 of the connector hub 7, enabling angular misalignment of the connector hub 7 through any necessary angle lying within the range of the angle B. Thus, in the form illustrated the connector can be made up with angular misalignment equaling the sum of the angles A and B.

This range of angular misalignment of the connector is accomplished in a structure which is relatively small in diameter as compared with a typical ball and socket connector wherein the total range of angular adjustment is accomplished by the use of a spherical ball surface engaging in a spherical socket and wherein the sealing diameter is accordingly relatively large.

During the making up of misalignment connectors in difficult environments, such as a subsea environment, where typically the tightening of the nuts and bolts 3 and 4 which are spaced circumferentially about the flanges 1 and 2 must be accomplished by divers or by manipulative devices provided by diving bells, the effective loading of the flange faces 5a and 5b together, so as to properly preload the internal metallic sealing ring into metal-to-metal sealing engagement with the internal spherical surfaces of the hubs, becomes very difficult. Not only are the tools for performing such asks unwieldy in the hands of divers or by manipulators, but the tightening of the fastenings must be accomplished in some sort of circumferential sequence, namely tightening the fastenings successively about the flanges, and then progressively retightening the fastenings until the flanges are properly loaded.

The present invention simplifies the operation of making up the connector C. In this connection, the flange 1 has an outer extension 36, forming the internal angular wall 32, and having at its outer extremity a shoulder or a face 37 which is spherical. Correspondingly, the connector flange 2 has an end extension 38 provided with an end shoulder surface 39 which is spherical. As seen in FIG. 1, a loading tool T is applicable to the opposite spherical flange surfaces 37 and 39 and is adapted to apply an axial force to the respective flanges urging the flanges towards one another and into abutting engagement at the radial faces 5a and 5b.

In the illustrative form, the tool T comprises thrust transmitting means engageable with the respective flanges 1 and 2. The tool includes a first radially split ring 40, composed of ring half parts hingedly interconnected at 41 and adapted to be clamped together by suitable clamping means such as a bolt 42 extending through outstanding ears 43 on the respective ring half parts. A second thrust transmitting, radially split ring 44 is hingedly interconnected at 45 at one side of the ring half parts, and clamped together at the opposite side by a bolt 46 extending through outstanding ears 47 on the respective ring parts. Extending between the rings are a suitable number of circumferentially spaced hydraulic actuator cylinders 48 having rods 49 projecting therefrom, the cylinders being connected at 50 to one of the thrust rings and the rods being connected at 51 to the other thrust ring, whereby the application of hydraulic fluid to the cylinders to retract the rods into the cylinders will apply opposite axial forces to the thrust rings 40 and 44, as indicated by the arrows 37a and 39a in FIG. 2. Suitable hydraulic lines 52 connect the cylinders 48 with a source line 53 to which hydraulic fluid can be supplied from a suitable source, say at a location on the vessel afloat in the water, or form some suitable hand operated pump beneath the sea.

As seen in FIG. 2, the opposing inner sides of the respective thrust rings 40 and 44 have spherical loading surfaces 37b and 39b engageable with the companion spherical thrust surfaces 37 and 39 on the connector flanges 1 and 2, whereby the thrust rings 40 and 44 can engage misaligned connector flanges and draw them towards one another. The connecting bolts 3 can be initially loosely installed when the flanges are drawn towards one another and then finally tightened after the confronting flange faces 5a and 5b have been loaded into abutting engagement. Without requiring illustration herein, it is apparent that if desired, means may be provided for aligning the respective bolt holes in the flanges as they are being drawn together.

During loading of the flanges 1 and 2 towards one another, the confronting spherical surfaces of the metallic seal ring 21 and the opposing hub ends 17 and 23 are moved into engagement and progressively the sealing ring is axially and circumferentially radially energized or loaded to cause a tight metal-to-metal seal between the metallic seal ring and the inner surfaces of the hub ends.

As previously indicated, initial proper positioning of the metal seal ring 21 with respect to the hub ends, particularly in a hostile or subsea invironment, is difficult to accomplish in any situation in which the seal ring will not rest within the spherical surface of one of the hub ends by gravity. Accordingly, in accordance with the present invention, retaining means are provided for initially supporting the seal ring 21 in a position with its spherical surface 20' in, or nearly in an engagement with the companion inner spherical surface 25 of the hub end 23. This retaining means is constructed so that the seal ring can be properly engaged by the other hub end 17 throughout the range of permitted angular misalignment of the hub ends and so that the seal ring can partake of the necessary angular and axial motion necessary for the proper preloading or energization of the seal ring 21. The retainer means is interconnected between an outer peripheral flange 54 located at the longitudinal center of the seal ring 21 and the end of the hub 7. The flange 54 may be segmented or may comprise a number of circumferentially spaced projections, but in any event, the flange provides the point of connection or a support to which a resilient member 55 can be attached by suitable fastener means or by a suitable articulated connection, as will be later described, whereby the seal ring 21 can partake of the necessary movements. In the form of FIGS. 2 and 3, the supporting member 55 is attached to the flange 54 by a fastener 56 and to the end face 54a of the connector hub or part 23 by a fastener 57, with the support member 55 and all fastenings therefor lying within the radial confines of the surface 54a of the hub end 23 and the opposing end surface 54b of the hub end 17, whereby when the hubs 6 and 7 are loaded together the retainer means R offers no interference to the effective making up of the connector and the effective preloading of the internal seal ring 21. In addition, it will be noted that the seal ring flange 54 has its opposite side surfaces equally spaced from the longitudinal center providing, abutment surfaces engageable with the respective hub ends 54a and 54b, so that the seal ring 21 will be limited in its angular movement with respect to the hub ends upon engagement of one side or the other of the flange 54 with one of the surfaces 54a and 54b, and the seal ring 21 will be angularly moved relative to the other hub, until such time as angular misalignment of the connector parts 17 and 23 is limited.

With the internal seal ring 21 retained in proper position by the retainer means R as described above, the connector can be easily made up as also described above, and following the making up of the connector, it may be desirable to perform certain pressure tests or to inject a sealant or epoxy material into the connector. Accordingly, between the seal ring 21, the flanges 1 and 2 and the opposing ends 54a and 54b of the hub ends 17 and 23, there is formed an annular space 58. One of the flanges, the flange 2 in the illustrated embodiment, has a radial port 59 adapted to be closed by screw threaded plug 60 at the outer end thereof. This port enables the performance of an external pressure test of the sealing effectiveness of the sealing ring 21 and also enables the injection of a sealant or epoxy material into the chamber 58. The chamber 58 is sealed between the confronting spherical surfaces of the flange, the hub ends and the sealing ring, and in addition, the chamber 58 is sealed between the confronting flange faces 5a and 5b, either by facial contact or by a suitable resilient seal ring 62 seated in an angular groove 63 formed between the flanges. Such a seal ring can be initially held in place in one of the flanges until the connector is finally made up. In the event that epoxy material is injected into the chamber 58, curing of the epoxy material will provide a rigid body between the confronting ends of the hubs 6 and 7, thereby locking the connector assembly against any angular movement after the epoxy is cured.

In effect the retainer member 55 is constituted by one or more resiliently flexible links between the internal seal ring 21 and the connector hub 23. In the form of the invention shown in FIGS. 2 and 3, the link 55 is formed by a leaf type spring or clip 70, having an opening 71 at one end for reception of the screw fastener 56 and having an opening 72 at the other end for reception of the screw fastener 57, whereby the spring clip is adapted to be connected to the respective seal ring and the hub 21 and 23. The spring clip 70 is arched or bent upon itself to form an intermediate bight enabling the seal ring 21 to stand off slightly from the hub end 23 while facilitating flexure of the link 70 as may be required to permit the necessary axial and circumferential, as well as, angular movements of the seal ring 21 as the connector hubs 17 and 23 are being loaded together, over the range of permissible angular adjustment. In this specific form, the spring clip 70 also has an elongated central opening 73 affording clearance space for the heads of the respective screw fasteners 56 and 57. In this form, a suitable number of the spring clips 70 constituting the retainer means R are spaced circumferentially about the internal seal ring 21, as may be necessary to adequately support the seal ring.

Referring to FIG. 5, another form of spring clip member 55 is illustrated as the retainer means R. In this form, the spring clip may be either in the form of a number of circumferentially spaced individual clips or in the form of a circumferentially continuous resilient ring 170 having between its ends a bight portion enabling the ring 21 to stand off from the hub end 23 and enabling flexure of the spring clip. The clip 170 is secured at one end of the link between the hub and the seal ring to the end face 54a of the hub end 23, as by means of circumferentially spaced fasteners 157 engaged in the hub end 23. At its inner periphery, the clip or link 170 is turned inwardly at its inner edge as indicated at 171 to provide a hook like portion engageable beneath a shoulder 172 formed in the sealing ring flange 54 at the upper side of a groove 173, the shoulder 172 being inclined downwardly and outwardly to assist in retention of the seal ring 21 upon the hook like end 171 of the retainer 170. Here again, it will be appreciated that the retainer means R initially positions or supports the seal ring 21 in a position with its outer spherical sealing surface 20' disposed in or nearly an engagement with the internal spherical surface 25 of the hub or connector part 23, so that when the connector is assembled together, the sealing ring 21 will be properly loaded between the opposing connector hubs.

Referring to FIG. 6, another form of resilient link support between the internal sealing ring 21 and the connector hub end 23 as illustrated. In this form, the link 55 is composed of a body 270 of elastomeric material, and may be in the form of a circumferentially continuous ring of such material suitably connected at its inner periphery to the sealing ring 21 and at its outer periphery to the hub end 23. As shown, the elastomeric material 270 is molded into an essentially dovetailed recess 271 extending about the outer periphery of the sealing ring flange 54. About its outer periphery, the elastomeric link is reinforced by an embedded metal ring 272 having openings 273 is circumferentially spaced locations adapted to receive the shanks of threaded fasteners 257, the heads of which clamp the outer periphery of the elastomeric ring 270 against the end face 54a of the hub part 23. The heads of the fasteners 257 are recessed within recesses 274 in the elastomeric material so that the heads will not interfere with movement of the hub ends of the connector towards one another in the event of extreme angular misalignment.

As seen in FIGS. 7 and 8, the resilient supporting means for initially positioning the internal ring seal 21 with respect to the hub part 23 is in the form of a coiled spring. Referring to FIG. 7, the coiled spring designated 370 is in the form of a compression spring. The hub end 23 has a suitable number of circumferentially spaced bores 371 therein, each containing one of the compression springs 370, the respective springs 370 being confined between an outer spring seat 372 retained in the outer end of the bore 371 by a suitable snap ring 373, and an inner spring seat 374 formed on a rod 375 which extends axially through the spring, through the spring seat 372 and outwardly of the bore 371 for connection with the outward projection or flange 54 on the seal ring 21. An articulated connection between the rod 375 and the seal ring 21 is provided, in the illustrated form of a ball 376 threadedly connected at 377 to the end of the rod 375, the ball being engaged in a spherical seat 378 provided in the support flange 54. Accordingly, it will be apparent that the retainer means R in this form, comprising a plurality of the spring loaded rods 375, will serve to initially position the internal seal ring 21 with respect to the connector hub 23, with the sealing ring spherical surface 20' disposed in or nearly in engagement with the confronting spherical surface 25 of the hub end or connector part 23, so that when the connector is assembled, the internal seal will be properly positioned and preloaded between the opposing hubs parts.

Referring to the form of the retainer means R shown in FIG. 8, the coiled spring is in the form of a tension spring 470. A plurality of the springs 470 are disposed in a corresponding plurality of circumferentially spaced bores 471 provided in the hub end 23 and project outwardly therefrom. The outer end of each coiled spring 470 is provided with a connecting eye 472 secured to the outer periphery of the sealing ring flange 54 by a suitable headed and threaded fastener 456, while the inner end of the coiled spring 470 has a connecting eye 473 secured at the bottom of the bore 471 by a headed and threaded fastener 457. Accordingly, it will be apparent that the plurality of the coiled spring retainer links 470 spaced circumferentially about the connector assembly can properly support the internal seal ring 21 with the outer spherical surface 20 thereof disposed in or nearly in engagement with the companion internal spherical surface 25 of the hub part 23, so that when the connector is assembled together the sealing ring 21 will be properly positioned and preloaded between the connector hubs over the full range of angular misalignment thereof.

From the foregoing, it will now be apparent that the present invention provides a misalignment connector, wherein the utilization of an internal seal ring engagable within the companion connector parts having spherical internal sealing surfaces provides a connector assembly which is capable of easy connection over a range of angles of misalignment, but the initial retention of the internal seal ring with respect to one of the connector parts, in a position for proper preloading substantially facilitates the making up of the connector, particularly in an environment wherein the connector parts are large and difficult to move about and where they may in a difficult environment such as a subsea environment.

I claim:

1. In a misalignment connector; a pair of metal connector members each having an internal spherical sealing surface; and a fluid passage therein; a metal seal ring having external spherical surfaces engaged by the sealing surfaces of said connector members for confining fluid in said passages; constraining means holding said connector members together over a range of angular misalignment; and retainer means initially supporting said metal seal ring in a position with respect to one of said connector members for engagement of said spherical surfaces of said metal seal ring and enabling angular movement of said metal seal ring relative to said connector members when said connector members are constrained together; said constraining means and said connector members providing additional spherical surfaces enabling the make up of said connector over a range of angles of misalignment.

2. In a misalignment connector as defined in claim 1; said constraining means including a pair of connector body parts having internal spherical surfaces, said additional spherical surfaces including external spherical surfaces on said connector members engaged by said internal spherical surfaces of said body parts.

3. In a misalignment connector as defined in claim 1; said metal seal ring having an external outward projection, said retainer means being connected to said projection and to one of said connector members.

4. In a misalignment connector as defined in claim 1; said metal seal ring having an external outward projection, said retainer means being connected to said projection and to one of said connector members, said connector members having end faces engageable with faces of said projection to angularly shift said metal seal ring upon misaligned make up of said connector.

5. In a misalignment connector as defined in claim 1; said metal seal ring having an external outward projection, said retainer means being connected to said projection and to one of said connector members, said connector members having end faces engageable with faces of said projection to angularly shift said metal seal ring upon misaligned make up of said connector, said faces extending correspondingly radially outwardly from the center of said spherical surfaces.

6. In a misalignment connector as defined in claim 1; said retainer means including resilient means connecting said metal seal ring to said one of said connector members.

7. In a misalignment connector as defined in claim 1; said retainer means including a plurality of circumferentially spaced resilient links, means connecting said links at one end to said one of said connector members, and means connecting the other end of said links to said metal seal ring.

8. In a misalignment connector as defined in claim 1; said metal seal ring having a circumferentially extended external flange between said spherical surfaces thereon, said connector members having end surfaces projecting outwardly from the spherical surfaces therein and engageable with said flange upon misaligned make up of said connector, said retainer means including a flexible support between said flange and the outwardly projecting surface of one of said connector members.

9. In a misalignment connector as defined in claim 8; said flexible support comprising a plurality of circumferentially spaced flexible spring links.

10. In a misalignment connector as defined in claim 8; said flexible support comprising an elastomeric link.

11. In a misalignment connector as defined in claim 1; said retainer means comprising a plurality of metal spring elements spaced circumferentially about and having ends connected with said metal seal ring and said one of said connector members.

12. In a misalignment connector as defined in claim 11; said spring elements being leaf spring clips, and including fastener means mounting one end of said clips to said one of said connector members, and means supporting said metal seal ring at the other end of said clips.

13. In a misalignment connector as defined in claim 11; said spring elements being leaf spring clips, and including fastener means mounting one end of said clips to said one of said connector members and means supporting said metal seal ring at the other end of said clips, said clips being bent between their ends to provide multi-directional flexibility.

14. In a misalignment connector as defined in claim 11; said spring elements being leaf spring clips, and including fastener means mounting one end of said clips to said one of said connector members, and fastener means supporting said metal seal ring at the other end of said clips.

15. In a misalignment connector as defined in claim 11; said spring elements being leaf spring clips, and including fastener means mounting one end of said clips to said one of said connector members, and means supporting said metal seal ring at the other end of said clips including a reversely turned lip on said clips and a circumferentially extended shoulder on said metal seal ring.

16. In a misalignment connector as defined in claim 1; said retainer means comprising a resilient ring extending about said metal seal ring, said resilient ring having an inner peripheral connection with the exterior of said metal seal ring and an outer peripheral connection with said one of said connector members.

17. In a misalignment connector as defined in claim 16; said resilient ring being elastomeric.

18. In a misalignment connector as defined in claim 16; said resilient ring being elastomeric and having metal reinforcing means at its outer periphery, said outer peripheral connection including fasteners extending through said reinforcing means into said one of said connector members.

19. In a misalignment connector as defined in claim 16; said resilient ring being elastomeric and being molded on said metal seal ring to provide said inner peripheral connection.

20. In a misalignment connector as defined in claim 1; said retainer means comprising a plurality of circumferentially spaced coiled springs interposed between said metal seal ring and said one of said connector members.

21. In a misalignment connector as defined in claim 20; said one of said connector members having circumferentially spaced openings receiving said coiled springs, means forming a spring seat in the outer ends of said openings, means including rods extending through said spring seats into said holes and forming an inner spring seat connected to said metal seal ring by said rods, said coiled springs being compressively disposed between said seats.

22. In a misalignment connector as defined in claim 21, means forming an articulated connection between said rods and said metal seal ring.

23. In a misalignment connector as defined in claim 20; said coiled springs being tension springs; said one of said connector members having circumferentially spaced openings receiving an end of said coiled springs, means connecting said end of said coiled spring to said one of said connector members in said openings, and means connecting the other end of said springs to said metal seal ring.

* * * * *